United States Patent

Sugita et al.

[11] Patent Number: 5,861,697
[45] Date of Patent: Jan. 19, 1999

[54] SINGLE-PHASE INDUCTION MOTOR AND ROTOR ASSEMBLING APPARATUS

[75] Inventors: Tatsuya Sugita; Takashi Yamamoto; Shinji Tamura; Tetsuya Mochizuki; Tokuo Tugei; Yoshinori Iwanabe, all of Tokyo, Japan

[73] Assignee: Mitsubishi Denki Kabushiki Kaisha, Tokyo, Japan

[21] Appl. No.: 738,913

[22] Filed: Oct. 28, 1996

[30] Foreign Application Priority Data

Oct. 31, 1995 [JP] Japan .................................. 7-283470

[51] Int. Cl.⁶ .................................................. H02K 17/00
[52] U.S. Cl. .......................... 310/166; 310/151; 318/781; 318/782; 318/785; 318/794; 318/799; 318/805
[58] Field of Search .................................... 310/151, 166; 318/785, 781, 782, 794, 799, 805

[56] References Cited

U.S. PATENT DOCUMENTS

| 4,772,814 | 9/1988 | Lewus | 310/72 |
| 4,794,288 | 12/1988 | Lewus | 310/68 R |

FOREIGN PATENT DOCUMENTS

| 95116930.0 | 8/1995 | China . |
| 0 570 672 | 11/1993 | European Pat. Off. . |
| 0 633 649 | 1/1995 | European Pat. Off. . |
| 58-172015 | 11/1983 | Japan . |
| 60-39352 | 3/1985 | Japan . |
| 63-55798 | 4/1988 | Japan . |
| 2-7391 | 1/1990 | Japan . |
| 2-211042 | 8/1990 | Japan . |

Primary Examiner—Nestor Ramirez
Assistant Examiner—Thanh Lam
Attorney, Agent, or Firm—Oblon, Spivak, McClelland, Maier & Neustadt, P.C.

[57] ABSTRACT

The invention relates to a single-phase induction motor comprising a main winding, an auxiliary winding which is arranged so that an electrical angle of the auxiliary winding is different from that of the main winding, a plurality of driving capacitors which are connected to the auxiliary winding, a relay for controlling on/off of the driving capacitor in response to the driving load, and a rotor having apertures on the gap side of the slots. The invention further relates to a rotor assembling apparatus comprising a bush to which a rotor core assembly is inserted for die-casting, wherein a clearance between said bush and said rotor core assembly is narrower to the extent that said rotor core assembly can be taken out after die casting; and a core band having a clearance between the core band and the bush in the circumferential direction of said bush, said core band is engaged into said bush so that movement in the axis direction is restricted. The present invention can prevent a generation of the electromagnetic noise even during a high-load and high torque operation.

5 Claims, 7 Drawing Sheets

SINGLE-PHASE INDUCTION MOTOR AND ROTOR ASSEMBLING APPARATUS

BACKGROUND OF THE INVENTION

1. Field of the Invention

The present invention relates to a single-phase induction motor in a hermetic compressor used in a refrigerator or an air conditioner.

2. Description of the Prior Art

FIG. 11 is a cross sectional view of a rotor 9 of a conventional single-phase induction motor disclosed in the Japanese Laid-open Utility Model publication No.58-172015. In FIG. 11, the rotor 9 comprises a circumference 9a of the rotor 9, slot portions 12 filled with die-cast aluminum, which constitutes a closed space in the rotor 9, teeth 13 between each slot portion 12, and bridges 14 for connecting each tooth 13 on the rotor circumference 9a side, respectively.

FIG. 12 is a cross sectional view of a rotor 9 of a conventional single-phase induction motor disclosed in the Japanese Laid-open Patent No. 60-39352. In FIG. 12, the rotor 9 comprises a circumference 9a of the rotor 9, slot opening portions 12a, and teeth 13, respectively.

In the rotor 9 in FIG. 11, the slot portion 12 constitutes a closed space in the rotor 9. The inside of the closed space is filled with the die-cast aluminum. Since the shape of the slot portion 12 is closed, it is generally referred to as a closed slot. In other words, the bridges 14 are laid between the rotor circumference 9a and the respective slot portions 12 to connect each tooth 13. The efficiency of a motor is improved, if the width of the bridge 14 is made narrower. However, a narrower bridge 14 tends to generate magnetic saturation and causes electromagnetic noise. A large electromagnetic noise is generated particularly during a high-torque operation when a capacitance of a driving capacitor is large.

The rotor 9 in FIG. 12 shows an example of open slots, having slot apertures 12a instead of the bridges 14 connecting each tooth 13 between the slot portion 12 and the rotor circumference 9a. However, the rotor circumferences 9a have to be cut off or buffed up after die-casting process which is carried out after a core laminating process, because aluminum spouts out of the slot aperture 12a toward the circumference during the aluminum die-casting process.

A conventional single-phase induction motor constructed in the above-mentioned way has following problems.

(1) The rotor 9 having closed slots tends to generate magnetic saturation due to narrow bridges 14 during a high torque operation when a capacitance of a driving capacitor is large, and generates an electromagnetic noise which makes a large noise during operation.

(2) The rotor 9 having open slots needs cutting-off or buffing-up of the rotor circumference 9a after die-casting, because aluminum spouts out of the slot apertures 12a toward the circumference during the aluminum die-casting process.

SUMMARY OF THE INVENTION

It is an object of the present invention is to provide a single-phase induction motor which can suppress the generation of electromagnetic noise even during a high torque operation when a capacitance of a driving capacitor is large.

It is another object of the invention is to provide a rotor assembling apparatus which eliminates the need of cutting-off or buffing-up the surface of the rotor circumference after die-casting if a rotor having open slots is used, by preventing aluminum from spouting out of the slot apertures during the aluminum die-casting.

According to one aspect of the invention, a single-phase induction motor comprises,a main winding; an auxiliary winding which is arranged so that an electrical angle of the auxiliary winding is different from that of the main winding; a plurality of driving capacitors connected to said auxiliary winding; a relay for controlling on/off of said driving capacitors in response to a driving load; and a rotor having apertures on the gap side (circumference side) of the slots.

According to another aspect of the invention, a rotor assembling apparatus comprises a bush to which a rotor core assembly is inserted for die-casting, wherein a clearance between said bush and said rotor core assembly is narrower to the extent that said rotor core assembly can be taken out after die casting; and a core band having a clearance between the core band and the bush in the circumferential direction of said bush, said core band is engaged with said bush so that movement in the axis direction is restricted.

According to further aspect of the invention, a rotor assembling apparatus comprises an oil pressure chuck into which a rotor core assembly is inserted for aluminum die-casting, wherein, the clearance between said rotor core assembly and the oil pressure chuck is larger during inserting said core assembly by decreasing the oil pressure, and said clearance is narrower during die-casting by increasing the oil pressure.

DETAILED DESCRIPTION OF THE PREFERRED EMBODIMENTS

Embodiment 1

Figure 1:
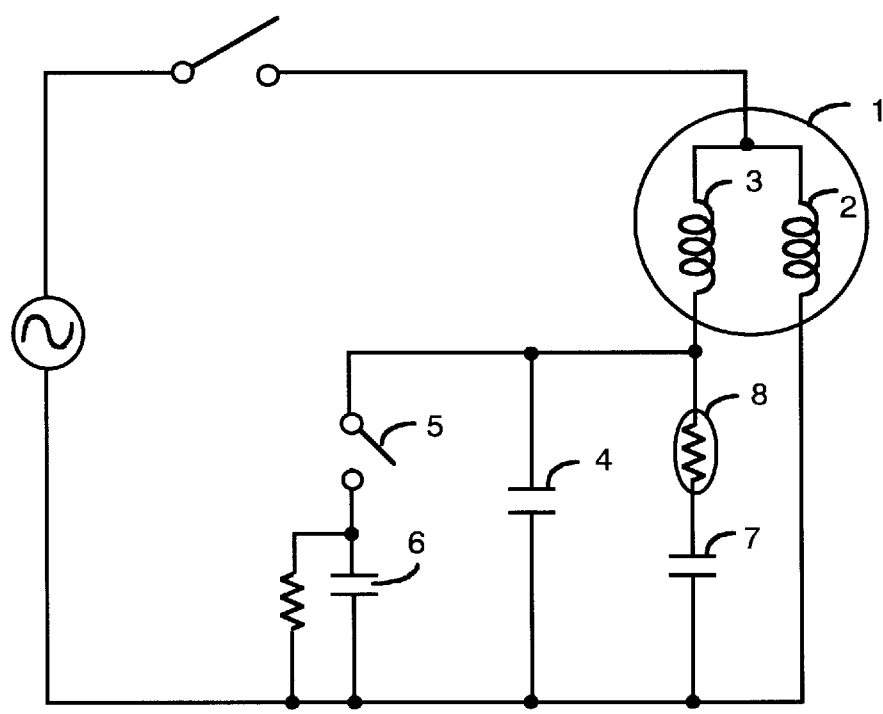
FIG. 1 is a circuit diagram of a single-phase induction motor according to a first embodiment of the invention.

A first embodiment of the present invention is described by referring to the drawings. FIG. 1 is a circuit diagram of a single-phase induction motor according to a first embodiment of the invention, which comprising a single-phase induction motor 1, a main winding 2 which is wound around stator of the electric motor 1, an auxiliary winding 3, a first driving capacitor 4 which is energized while the electric motor 1 is energized, a second driving capacitor 6 which is energized only during the high torque operation, and is cut off by a relay 5 during a low torque operation, a starting capacitor 7, and a PTC thermistor 8 which is a starting relay to cut off the starting capacitor 7 immediately after the motor is started-up.

Figure 2:
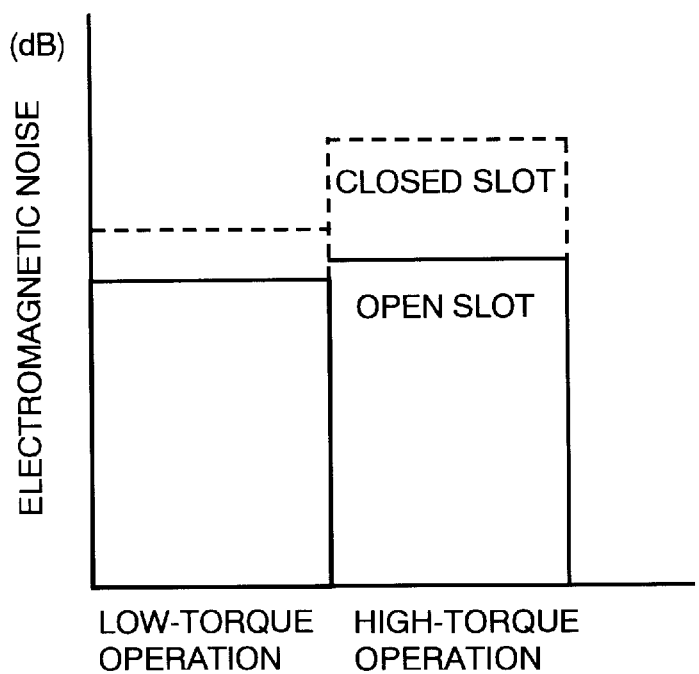
FIG. 2 is a diagram showing a noise level of electromagnetic noise generated in the single-phase induction motor according to the first embodiment of the invention.
Figure 11:
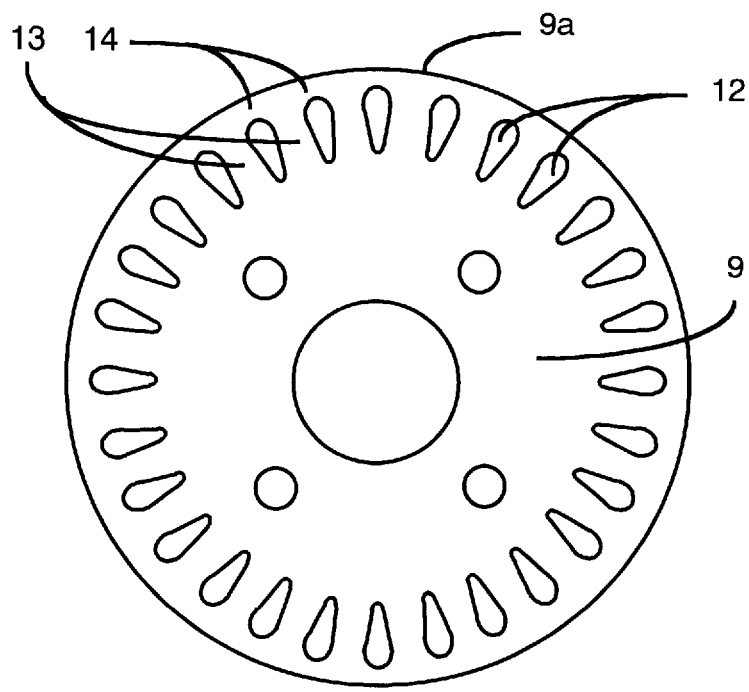
FIG. 11 is a cross sectional view of a (closed-slot) rotor of a conventional single-phase induction motor.
Figure 12:
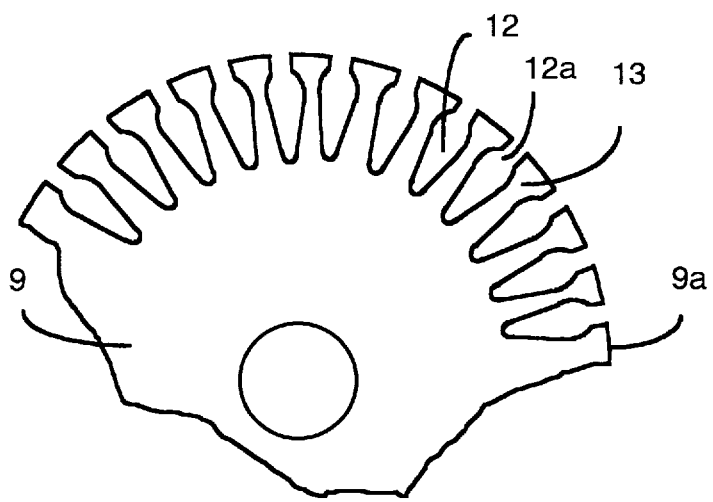
FIG. 12 is a cross sectional view of an (open-slot) rotor of a conventional single-phase induction motor.

Electromagnetic noise when using an open-slot rotor of FIG. 12 or a closed-slot rotor of FIG. 11 in the single-phase induction motor of FIG. 1, is explained below. FIG. 2 is a diagram showing the experimental result during a high-torque operation (i.e. the relay 5 turns on and both the first driving capacitor 4 and the second capacitor 6 are energized) and a low-torque operation (i.e. the relay 5 turns off and only the first driving capacitor 4 is energized). The electromagnetic noise generated by the open-slot rotor is lower than the noise generated by the closed-slot rotor during a low-torque operation and also during a high-torque operation. For the electromagnetic noise during the high-torque operation, the difference is remarkably large.

Figure 3:
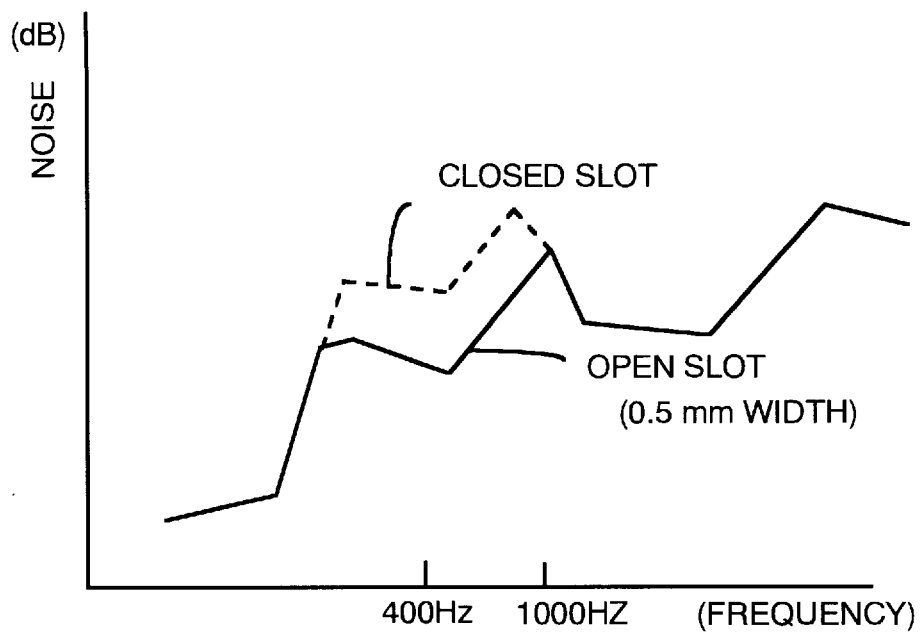
FIG. 3 is a diagram showing a curve of noise level to frequency of the electromagnetic noise generated in the single-phase induction motor according to the first embodiment of the invention.
Figure 4:
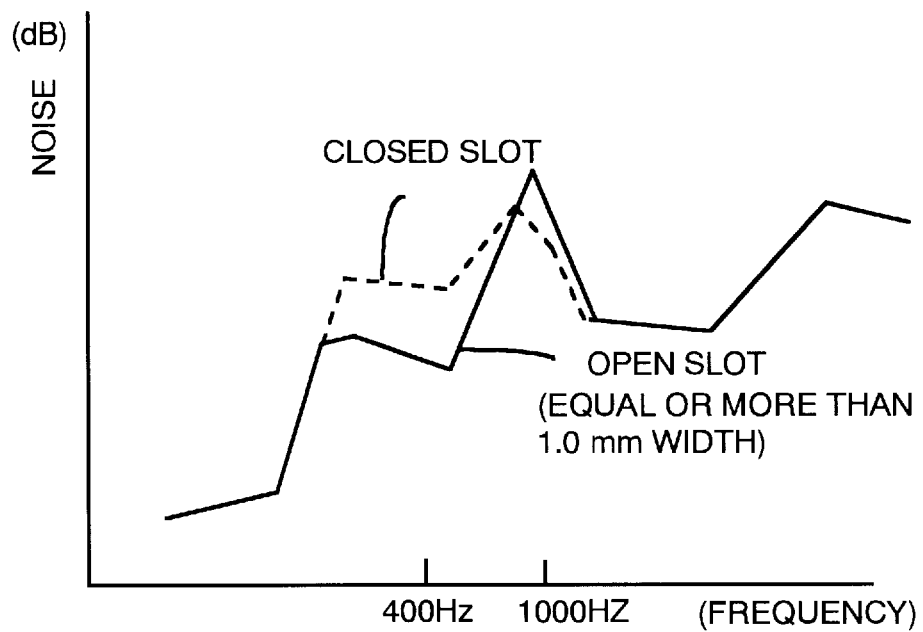
FIG. 4 is a diagram showing a curve of noise level to frequency of the electromagnetic noise generated in the single-phase induction motor according to the first embodiment of the invention.

FIG. 3 and FIG. 4 are diagrams showing the noise level in a case of using rotors 9 having a different width of the slot aperture 12a, respectively. As shown in FIG. 4, when the width of the slot aperture is 1 mm or more, the electromagnetic noise of the open-slot rotor is lower than the closed-slot rotor at around 400 Hz. On the other hand, the electromagnetic noise of the open-slot rotor generated by the groove harmonic is higher than the closed-slot rotor at around 1000 Hz. However, an overall level of the electromagnetic noise generated by the open-slot rotor is lower than that of generated by the closed-slot rotor. FIG. 3 is a diagram showing an experimental result of the electromagnetic noise when the width of the slot aperture 12a is 0.5 mm. The level of the electromagnetic noise generated by the open-slot rotor is lower than that of the closed-slot rotor over whole frequencies, especially the level difference between the closed-slot rotor and the open-slot rotor is large at around 40 Hz.

The present invention especially concerns the electromagnetic noise at around 400 Hz, which generally belongs to a low frequency tone. Since this low frequency tone is, for example, radiated from the surface of the compressor and permeated from the refrigerator main frame, it is very difficult to cut off the noise perfectly. Therefore, the most effective way for preventing the noise radiation and noise permutation is to lower the level of the sound source.

According to the first embodiment, when a driving-load is high, the capacitance is increased to obtain a high torque, and when a driving-load is low, the capacitance is decreased to obtain a low torque. Accordingly, the motor operates very efficiently during a low driving-load, and overall it results in a highly efficient operation. Moreover, the rotor core includes slot apertures 12a which have no bridges 14 which exist between each slot 12 and the rotor circumference 9a to joint each tooth 13. Therefore, it is possible to avoid the magnetic saturation and to suppress the generation of the electromagnetic noise even during a high-load and high torque operation. As a result, a low-noise single-phase induction motor can be obtained.

Embodiment 2

Figure 5:
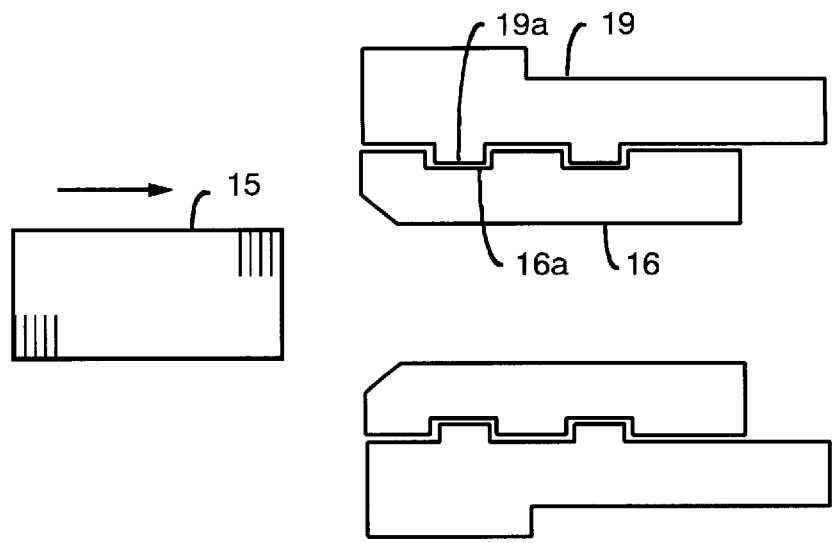
FIG. 5 is a cross sectional view showing how to press-fit a rotor core assembly into a bush in a rotor assembling method according to a second embodiment.
Figure 6:
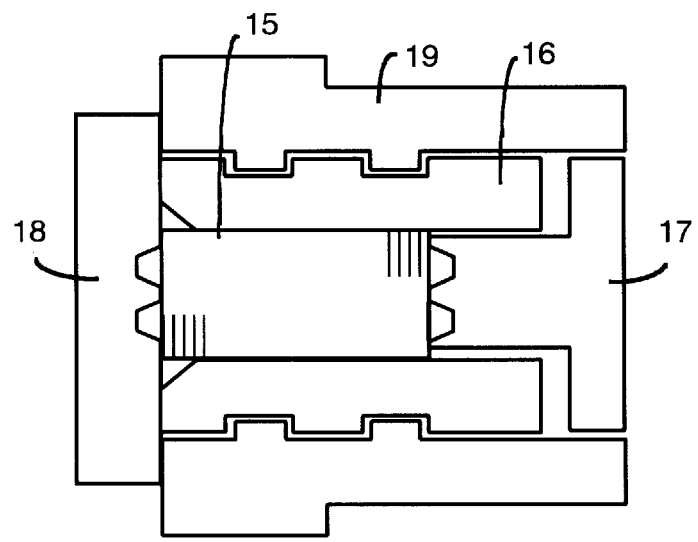
FIG. 6 is a cross sectional view of a die-casting jig according to a second embodiment.
Figure 7:
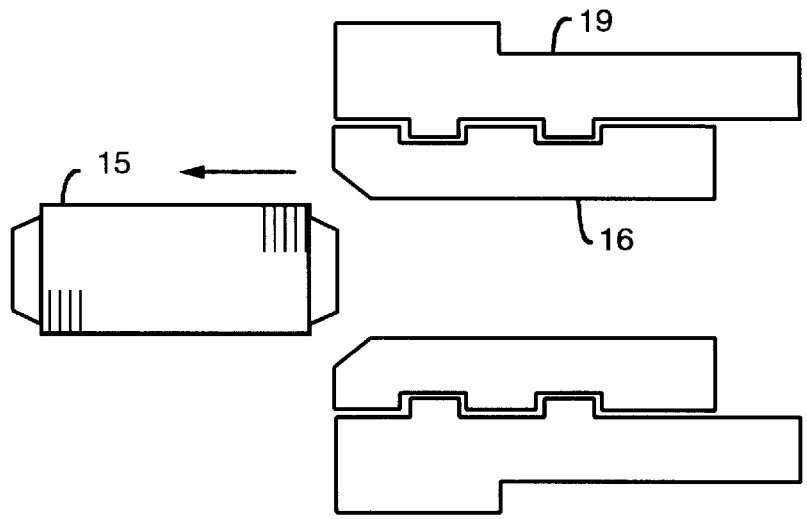
FIG. 7 is a cross sectional view showing the state of taking-off the rotor core assembly from the bush according to the second embodiment.

A second embodiment of the present invention is described by referring to the drawings. FIG. 5 is a method for press-fitting a rotor core assembly into a bush in a rotor assembling method according to the second embodiment. FIG. 6 is a cross sectional view of a die-casting jig. FIG. 7 is a diagram showing a state for taking off the rotor core assembly from the bush. In FIG. 5~FIG. 7, the figures comprises a rotor core assembly 15 which is laminated by punched steel plates of open-slot rotor shape, a bush 16 into which the rotor core assembly 15 is inserted when die-casting, a concave portion 16a which is formed on the peripheral of the bush 16, a removable jig 17, a fixed jig 18, a core band 19 which is engaged with the bush 16 leaving a clearance between their surfaces, and a convex 19a which is interlocked with the concave 16a of the core bush 16.

Figure 8:
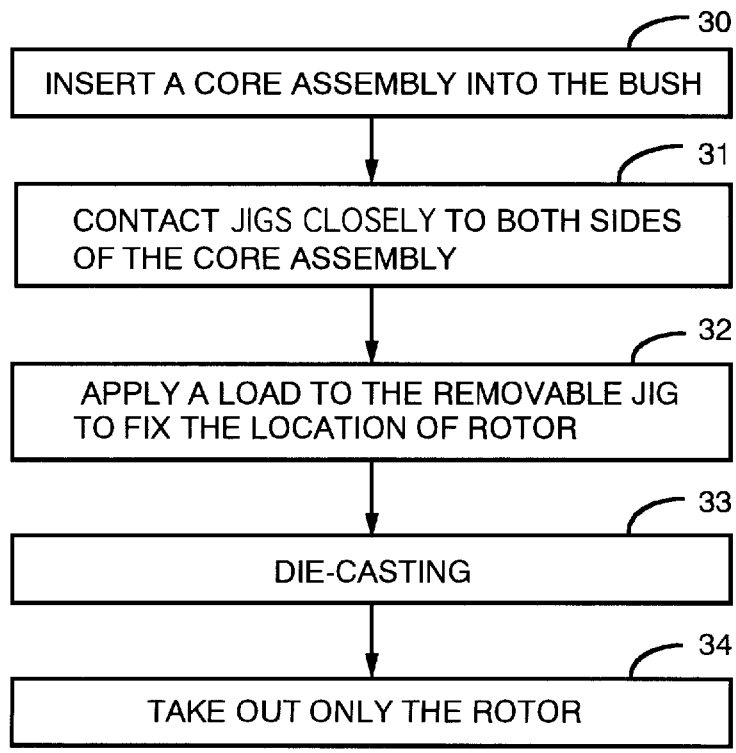
FIG. 8 is a flow chart showing how to manufacture the rotor assembly according to the second embodiment.

FIG. 8 is a flow chart showing how to manufacture the rotor assembly. In step 30, a core assembly is inserted into the bush 16. In step 31, the removable jig 17 and the fixed jig 18 closely contact to the respective edges of the core assembly 15. In step 32, a load is applied to the removable jig 17 to fix the location of the rotor. After die-casting in step 33, only the rotor is taken out in the step 34.

In the drawing, the convex of the core band 19 is engaged with the concave of the bush 16, leaving a clearance between them. Since the convex exactly interlocked with the concave, the bush 16 never slides out of the core band 19, if the frictional force acts on the bush 16 in the directions of the axis, when the core assembly 15 is inserted or taken out. The same effect results if the core band 19 has a convex and the bush has a concave on its peripheral.

By making a clearance between the core assembly 15 and the bush 16 narrower, it can prevent the aluminum from spouting out from clearance between the core assembly 15 and the bush 16 during die-casting. Accordingly, the core assembly 15 can be taken out easily after die-casting. This also eliminates the need of cutting-off or buffing-up of the rotor circumference 9a after die-casting, since spouting out of aluminum between the core assembly 15 and the bush 16 can be prevented, even if the open-slot rotor 9 is used. As a result, the cost required for manufacturing the open-slot rotor can be significantly decreased. Moreover, since the bush 16 is fixed to the die-casting machine together with the core band 19, this stabilizes the accuracy of press-fitting. Furthermore, since only the rotor 9 is taken out, this facilitates the mass production as well as the automization.

Embodiment 3

Figure 9:
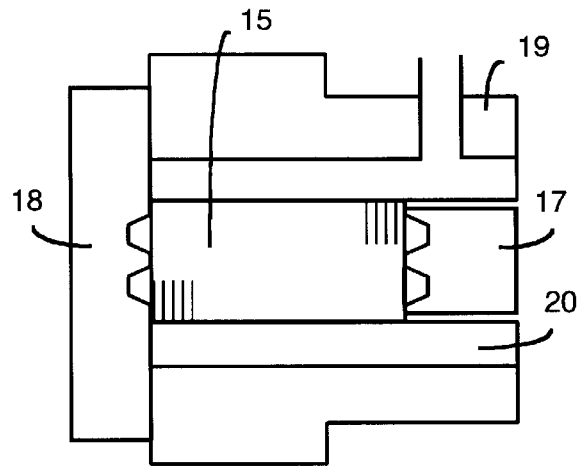
FIG. 9 is a cross sectional view of the rotor assembling apparatus of the third embodiment of the invention.
Figure 10:
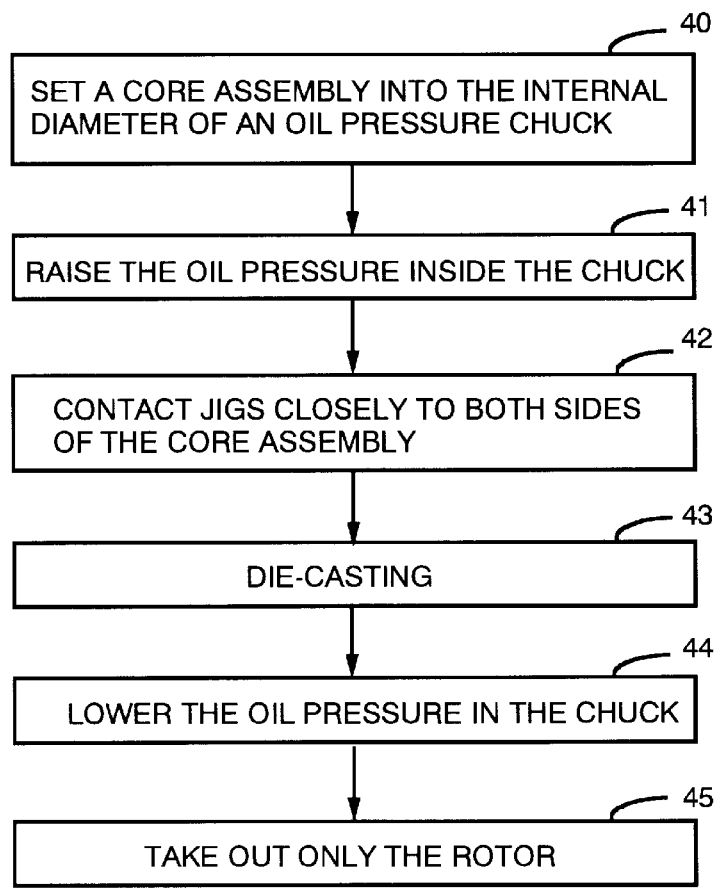
FIG. 10 is a flow chart showing how to manufacture the rotor assembly according to the third embodiment.

A third embodiment of the present invention is described by referring to the drawings. FIG. 9 is a cross sectional view showing an assembling structure by the oil pressure chuck system according to the rotor assembly method of the third embodiment of the invention. FIG. 10 is a flow chart showing a rotor assembling process. According to the manufacturing process of the third embodiment, the core assembly 15 is inserted into the oil pressure chuck 20 in the core band 19 (step 40). The removable jig 17 and the fixed jig 18 closely contact to the respective edges of the core assembly 15, and then raises the oil pressure in the oil pressure chuck 20 (step 41) which makes the clearance between the core assembly 15 and the oil pressure chuck 20 narrower (step 42). Then, the aluminum is die-casted (step 43). After then the oil pressure in the oil pressure chuck 20 (step 44) is lowered. After then, only the rotor is taken out (step 45), which prevents the aluminum from spouting out from the slots apertures 12a of the circumference portion. The internal diameter of the oil pressure chuck 20 is fine-controlled by changing the oil pressure, which is possible to make the clearance between the core assembly 15 and the oil pressure chuck 20 zero.

On the other hand, since the clearance between the core assembly 15 and the oil pressure chuck 20 is large before raising the oil pressure, the core assembly 15 can be easily set in the oil pressure chuck 20. Moreover, in the present embodiment, spouting out of aluminum from between the core assembly 15 and the oil pressure chuck 20 can be prevented during die-casting, and therefore the core assembly 15 can be easily taken out by lowering the oil pressure after die-casting. As described above, this eliminates the need of cutting-off or buffing up the circumference of the rotor 9 after die-casting, and therefore an open-slot rotor can be manufactured cost-effectively compared with a conventional process which requires cut-off or buff-up. Moreover, since the core assembly 15 is set quite easily, it is possible to reduce both manufacturing time and cost. Furthermore, the process of the third embodiment is preferable in the durability of the jig in comparison with the process in which the bush 16 is engaged, because none of the portion is worn down.

What is claimed is:

1. A single phase induction motor comprising:

a main winding;

an auxiliary winding which is arranged so that an electrical angle of the auxiliary winding is different from that of the main winding;

a starting capacitor which is cut-off after the single phase induction mode is started up;

a plurality of driving capacitors connected to said auxiliary winding;

a relay for controlling on/off of said plurality of driving capacitors in response to a driving load; and a rotor having slots.

2. The single phase induction motor according to claim 1, wherein the slots of the rotor are open slots at a periphery of the rotor.

3. A single phase induction motor comprising:

a main winding;

an auxiliary winding which is arranged so that an electrical angle of the auxiliary winding is different from that of the main winding;

a starting capacitor which is cut-off after the single phase induction motor is started up;

first and second driving capacitors connected to said auxiliary winding;

a relay for controlling on/off of said first and second driving capacitors in response to a driving load;

wherein the first driving capacitor is energized when the single phase induction motor is energized and the second driving capacitor is energized only during a relatively high torque operation of said single phase induction motor.

4. The single phase induction motor according to claim 3, further comprising a rotor having slots.

5. The single phase induction motor according to claim 4, wherein the slots of the rotor are open slots at a periphery of the rotor.

* * * * *